US006724402B1

(12) United States Patent
Baquero

(10) Patent No.: US 6,724,402 B1
(45) Date of Patent: Apr. 20, 2004

(54) METHOD OF LAUNCHING COMPUTER PROGRAMS WITHIN A GRAPHICAL USER INTERFACE

(76) Inventor: David R. Baquero, 3320 NE. 39 St., Fort Lauderdale, FL (US) 33308

( * ) Notice: Subject to any disclaimer, the term of this patent is extended or adjusted under 35 U.S.C. 154(b) by 0 days.

(21) Appl. No.: 09/492,555

(22) Filed: Jan. 27, 2000

(51) Int. Cl.[7] .................................................. G06F 3/00
(52) U.S. Cl. ..................................... 345/765; 345/808
(58) Field of Search ................................ 345/808, 810, 345/853, 775, 776, 840, 841, 765; 767/513, 514, 530

(56) References Cited

U.S. PATENT DOCUMENTS

| 5,404,524 A | 4/1995 | Celi, Jr. |
| 5,406,310 A | 4/1995 | Aschenbrenner et al. |
| 5,673,403 A | 9/1997 | Brown et al. |
| 5,797,003 A | 8/1998 | Voce |
| 5,877,765 A | 3/1999 | Dickman et al. |
| 5,897,257 A | 4/1999 | Chen |
| 5,918,039 A | 6/1999 | Buswell et al. |
| 5,983,245 A | * 11/1999 | Newman et al. ............ 707/513 |
| 6,028,604 A | * 2/2000 | Matthews, III et al. ..... 345/810 |
| 6,046,741 A | * 4/2000 | Hochmuth .................. 345/853 |

* cited by examiner

Primary Examiner—Cao (Kevin) Nguyen
(74) Attorney, Agent, or Firm—Malin, Haley & DiMaggio, P.A.

(57) ABSTRACT

The invention encompasses a method of identifying computer programs existing within a graphical user interface. This method of identifying programs also can include steps to organize the interface by deleting the redundant and resource-consuming shortcuts that relate to the identified programs. The invention also includes a method of launching identified programs based on the identifiers created according to the first method. To execute these methods, the invention also encompasses a computer application capable of executing each of the above-described methods.

14 Claims, 3 Drawing Sheets

METHOD OF LAUNCHING COMPUTER PROGRAMS WITHIN A GRAPHICAL USER INTERFACE

BACKGROUND OF THE INVENTION

1. Field of the Invention

The invention relates to computer applications that identify and launch programs within a graphical user interface.

2. Description of the Related Art

As computers have proliferated, more people having less technical knowledge of computers, are depending on computers for various aspects of the personal life, as well as in their professions. To make computers easier to use (especially for non-programmers), graphical user interfaces have been added to computers. Graphical user interfaces de-emphasize the use of text programming commands and instead use more intuitive devices like icons to identify, launch, and manipulate programs. For purposes of this application, the term "programs" is to be construed broadly so as to include all computer files including but not limited to applications, documents, programs, and shortcuts. Graphical user interfaces commonly employ an input device known as mouse with which the user can control programs and input data without using a keyboard. For example, users can launch programs by using their mouse to move a cursor over an icon that represents the program and then selecting the icon by clicking on it. Even when using a graphical user interface, a user often must navigate through several folders (also known as directories) and sub-folders to reach the program that is to be launched because programs are located in a file system hierarchy. If a user does not know the exact location of the program, the user may lose time when searching for the program.

To provide access to files that may be buried within the file system hierarchy, graphical user interfaces now include shortcuts. Shortcuts relate to another program and launch that program even when the program is buried in the file system. By placing shortcuts in an easily reachable area such as the desktop or start menu, a user easily can launch the program even when it is buried within the filing system hierarchy.

In the WINDOWS® operating system or environment, the most common types of shortcuts are desktop shortcuts and start-menu shortcuts. Desktop shortcuts exist in the folder of the graphical user interface that is shown by default; this default folder is known as the "desktop". Therefore, desktop shortcuts allow the user to launch programs directly from the desktop without searching the file system. Start-menu shortcuts are usually arranged in a hierarchy that resembles the file system and include shortcuts that allow the user to reach important and often used files quickly.

The ease of use of graphical user interfaces provided by features such as those listed above have increased their popularity. Graphical user interfaces such as those sold under the trademarks WINDOWS®, MacOS®, and LINUX® are among the most used programs in the world. Of these, WINDOWS® is the most popular. Because WINDOWS® is so prevalent, it will be used as an example to detail the shortcoming prevalent in all graphical user interfaces.

One problem with WINDOWS® and other graphical user interfaces is that they require significant amounts of time (minutes) to boot. The long boot time increases as more large-sized programs load during the boot process. One group of programs that increase the boot time is shortcuts. Shortcuts typically include a graphical image or "icon" associated with the shortcut. When the icon includes high-resolution graphics and many colors, the file size and memory consumption likewise increase; this slows booting. Even when the file size of an individual shortcut may be small, the total memory consumed increases when a number of shortcuts are aggregated. Start-menu icons consume memory and slow booting in the same way as desktop shortcuts.

Another problem with WINDOWS is that the desktop may become cluttered with unwanted shortcuts. When new programs are installed, the application often will create a desktop shortcut and start-menu shortcut automatically. Over time, the desktop and start menu become cluttered with shortcuts that the user does not use or require. In addition, these unused shortcuts make differentiating important icons from the clutter of unwanted shortcuts more difficult. Similarly, as the start menu becomes more cluttered, users have difficulty locating the important often-used shortcuts from the clutter.

Attempts have been made in the past to provide shortcuts for launching applications and to speed the booting of WINDOWS®. None of these previous attempts have been able to provide a customizable method of launching programs that does not slow the booting of a graphical user interface such as WINDOWS®.

U.S. Pat. No. 5,897,257, issued to Chen discloses a "Keyboard with Expandable Function Keys." This invention is a hardware solution that adds buttons to a keyboard that launches programs when pressed. The invention does not speed the booting of WINDOWS®. The user also cannot customize the keyboard to provide shortcuts to the user's chosen programs after the keyboard has been manufactured.

U.S. Pat. No. 5,877,765, issued to Dickman, et al. discloses a "Method and System for Displaying Internet Shortcut Icons on the Desktop." The invention involves the creation of desktop shortcuts that point to remote resources such as Internet URL's. The invention does nothing to speed the loading of windows. In fact, the shortcuts proposed by Dickman et al. are at least some of the type of problems that the present invention is intended to eliminate.

U.S. Pat. No. 5,797,003, issued to Voce discloses a "Quick Access to Computer Applications." The invention relates to locking an application in memory (RAM or ROM) before putting the computer to sleep (not turning the computer off completely and rebooting), so that the computer can quickly load the application without the normal delays of loading the application from the hard drive. The invention does not streamline the booting of WINDOWS®, nor does it provide shortcuts to launch programs.

U.S. Pat. No. 5,404,524, issued to Celi discloses a "System for Identifying Attached Input Pointing Devices, Loading Associated Software Routines, and Interacting with Anyone Input Pointing Device While Disabling the Others." This invention involves the use of several input devices such as a mouse, trackball, and touch pad. According to the invention, drivers for all of the devices are loaded at booting and then one device is selected at a given time. The input device can be switched without exiting any open applications. Because multiple drivers are loaded during booting, this invention actually slows the booting process. In addition, the invention does not provide desktop shortcuts.

The prior art demonstrates a clear need for improvements in graphical user interfaces such as WINDOWS®.

Specifically, it is needed in the art for a quick, easy, customizable method of launching programs that does not slow the booting of the graphical user interface.

SUMMARY OF THE INVENTION

The invention encompasses a method of identifying computer programs existing within a graphical user interface. The method can also include steps to organize the interface by deleting the redundant and resource-consuming shortcuts that relate to the identified programs. The invention also includes a method of launching identified programs based on the identifiers created according to the first method. To execute these methods, the invention also encompasses a computer application capable of executing each of the above-described methods. The applications of the present invention are preferably launched either by keyboard or mouse click.

The invention also encompasses a method of launching a program within a graphical user interface and reducing the time required to boot the graphical user interface. This method preferably comprises the following steps: creating an identifier for a program that exists within a graphical user interface, associating said identifier with said program, storing said identifier in an application, and having said application launch said program whenever said identifier is entered into said application. The method may contain the additional step of deleting the program that has been identified by the method. This method of identifying and launching programs does not require the use of desktop shortcuts and start-menu shortcuts to ease the launching of programs. The types of programs that can be identified and launched include but are not limited to applications, documents, desktop shortcuts, and start-menu shortcuts. While the identifier being used might be any combination enterable on a computer, the identifier most often is a combination of alphanumerical keystrokes that suggest the name of the program being identified. While the method of identifying and launching programs is applicable to any graphical user interface, the preferred graphical user interface is one of the type sold under the trade name WINDOWS®. When running in WINDOWS®, the application appears as a window. Finally, the application can be used to identify and launch a plurality of programs each having a unique identifier.

The invention makes the launching of programs easier. To launch a program, a user enters the identifier for a related program. The application then launches the program that relates to the identifier. Typically, identifiers are combinations of alphanumerical keystrokes. This method of launching programs no longer requires the user to locate individual desktop shortcuts from long lists of other undesired shortcuts. Similarly, the invention allows a user to save time by not requiring the user to wait for the start menu to unfold and, then once unfolded, the user no longer must find the start-menu shortcut that is to be launched.

The invention, by providing a computer application capable of eliminating unwanted programs and shortcuts, shortens the time that a graphical user interface requires to boot, while still allowing users to launch programs easily. The invention eliminates many of the desktop shortcuts that accumulate while at the same time provides easier access to the programs related to deleted shortcuts. Deleting desktop shortcuts speeds booting because the graphical user interface does not waste time and resources loading shortcuts and particularly the memory-absorbing graphical images that accompany them. These graphical images when amassed absorb much of a system's spare resources, especially when the computer has small amounts of memory and when the computer is running in high-color or high-resolution display modes. Another related advantage of the invention is that programs that the user decides to keep become relatively more pronounced once the unimportant shortcuts are removed.

The invention provides increased access to commonly launched programs by adding one-click buttons that launch these programs. Examples of these commonly-launched programs include but are not limited to the following: the default web browser, a blank email message, volume control, time, date, and monitor resolution controls. The buttons included in the application do not clutter and slow the system like the desktop shortcuts and start-menu shortcuts because they include text only and eliminate memory-consuming graphics. The memory consumed is also controlled because the buttons that are included are only the most commonly launched applications.

In accordance with these and other programs that will become apparent hereinafter, the instant invention will now be described with particular reference to the accompanying drawings.

DETAILED DESCRIPTION OF THE PREFERRED EMBODIMENTS

The invention encompasses a method of identifying computer programs accessible by a graphical user interface. This method of identifying also can include steps to organize the interface by deleting redundant and resource-consuming shortcuts that point to the identified programs. The invention also includes a method of launching computer programs within a graphical user interface based on the identifiers created by the first method. To execute these methods, the invention also encompasses a computer application capable of executing all of the above-described methods.

Figure 3:
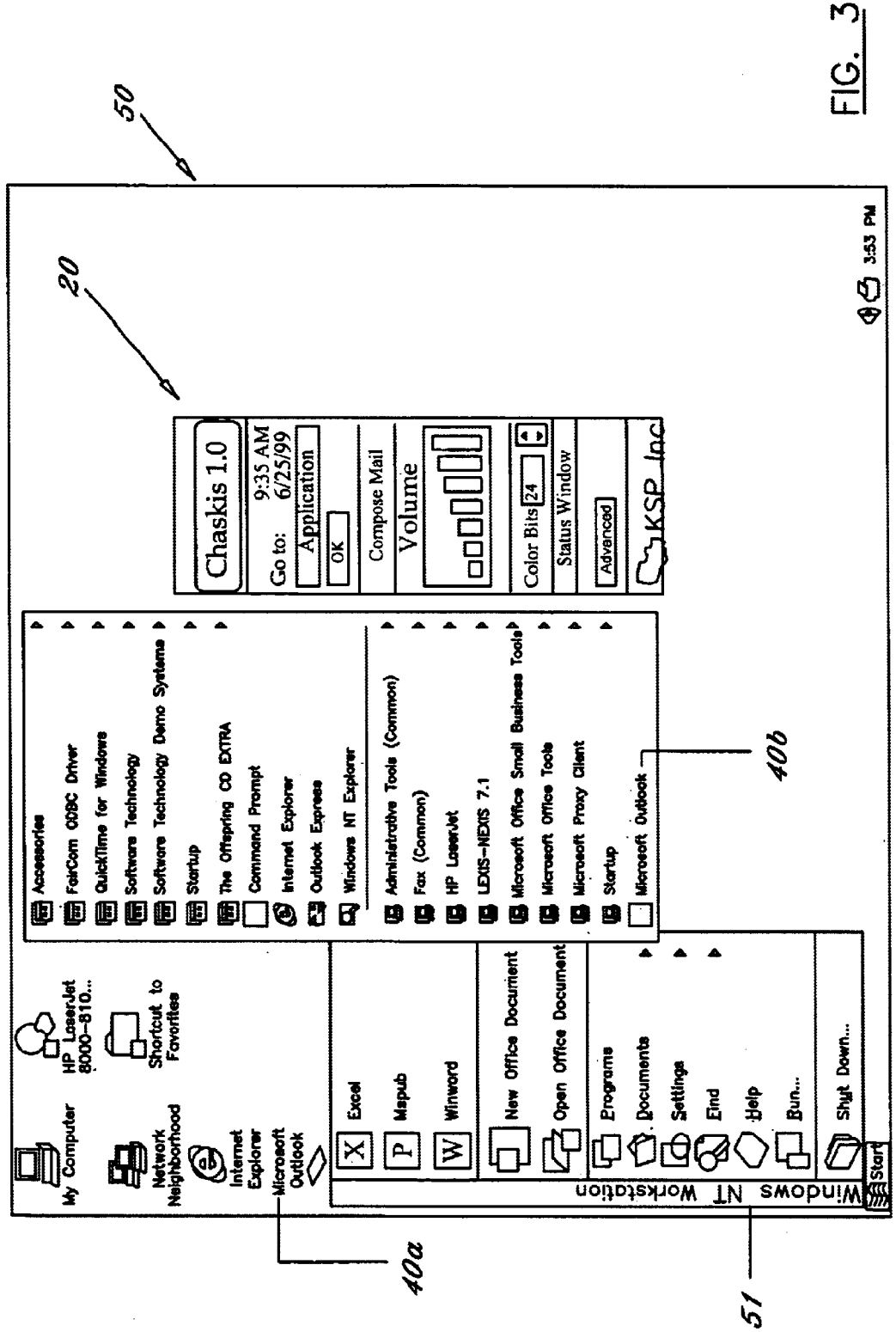
FIG. 3 is a screen shot of a graphical user interface showing the application in FIG. 2 running as well as desktop shortcuts and the start menu in an unfolded state.

FIG. 3 is a screen shot of a graphical user interface 50 that the invention can optimize. Interface 50, as depicted, is the type sold under the trademark WINDOWS®. While the invention works within WINDOWS®, the invention is not limited to WINDOWS® or any other interface, and all types and brands of interfaces can be used and are considered within the scope of the present invention. Furthermore, the invention also expressly includes interfaces such as those sold under the trademarks MacOS®, JAVA®, and LINUX®. Desktop shortcut 40a is located within graphical user interface 50. When selected, desktop shortcut 40a launches a related program. Examples of the types of programs included are applications, documents, shortcuts, and objects. FIG. 3 also depicts start menu 51 in its "unfolded" state. When unfolded, start menu 51 displays start-menu shortcuts 40b that when selected launch a related program. In the unfolded state, start menu 51 reveals its hierarchical structure.

Figure 1:
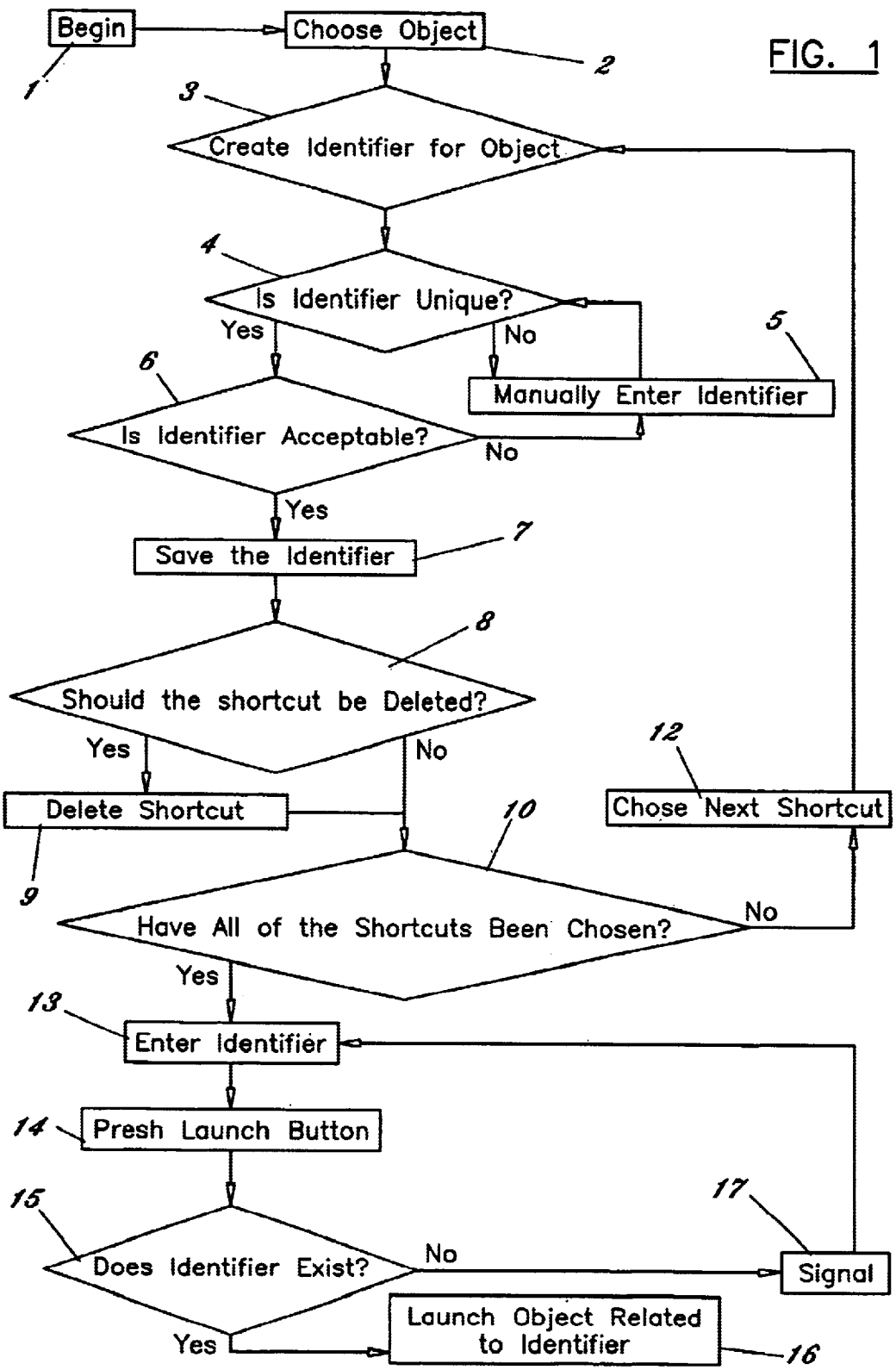
FIG. 1 is a flow chart depicting a method of identifying and launching computer programs existing within a graphical user interface.

FIG. 1 is a flow chart depicting a preferred embodiment of a method of identifying programs within a graphical user interface. In step 1, the method is initiated. The method can be initiated automatically when the application is installed. An additional means of initiating the method can be included so as to cause the method to be initiated automatically after a set amount of time has expired. A third way to initiate the method is for the user to initiate the method manually.

Next, step 2 of the method of identifying programs is to choose a program to be identified. A preferred type of program to be identified is a shortcut 40. Shortcut 40 can be any of several types of shortcuts including desktop shortcut 40a and start-menu shortcut 40b.

Next, in step 3, an identifier is created for the chosen shortcut 40. Preferably, the application will suggest an identifier based on the first few letters of shortcut 40. For example, if the shortcut were for "Outlook", then the application might suggest an identifier of "OU".

In step 4, the application checks that the selected identifier has not already been reserved. Each identifier must be unique in order to guarantee that each identifier only relates to one program. If the identifier is not unique, then the method proceeds to step 5. If the identifier is unique, then the method proceeds to step 6.

In step 5, the user is asked to enter manually an identifier. Typically, an identifier is an alphanumerical sequence of keystrokes that suggest the name of the program being identified. Manually entering an identifier allows the user to suggest a unique identifier that the user is able to remember.

In step 6, if the identifier is unique, the application asks the user to accept the identifier. If the user accepts the identifier, the application saves the identifier (see step 7). If the user does not accept the identifier, then, as provided in step 5, the user can enter manually a different identifier. The application then checks the manually entered identifier for uniqueness and asks the user if the identifier is acceptable. If the manually entered identifier is not unique or acceptable, then the user can repeat entering different identifiers until the user chooses a satisfactory identifier.

In step 7, the application saves the identifier and its relationship with the underlying program. By saving the identifier and relationship, the application can launch the related program whenever a user enters the identifier.

Once the application saves the identifier, in step 8, the application asks the user whether the program related to the identifier is to be deleted. If the program is a desktop shortcut 40a or start-menu shortcut 40b, the user may want to delete the program. By deleting the program, the desktop and start menu will contain fewer programs. By decreasing the number of programs, the graphical interface will boot quicker because the information for the deleted programs will not need to be loaded. In addition, system resources are conserved by not spending memory on the deleted programs. Another benefit of removing shortcuts is that interface 50 becomes less crowded and the most important programs become easier to locate. If the underlying program is an application or document (and not merely a shortcut), then the underlying program usually should not be deleted. Means for detecting whether an underlying program is a shortcut can be included in the application.

Once the application has set up the identifier relating to the chosen program, according to steps 10 and 11, another program can be chosen and set up through the same method. This method can be repeated until all of the programs have been identified; see step 12.

FIG. 1 is a flow chart depicting a method of using the identifiers created by the previous method to launch the programs that relate to an entered identifier. First, the computer application is executed within interface 50. The preferred form of the application is window 20. Window 20 includes identifier field 24 where the user enters an identifier. Once entered, the user presses launch button 25. If the user enters an identifier that was previously saved, then the program related to the identifier is launched. If the entered identifier does not exist, the application signals the user by means such as a beep. The user then can enter a different identifier. Once a program has been launched, the application continues to run so that other programs may be launched. A user may close the application at any time.

Figure 2:
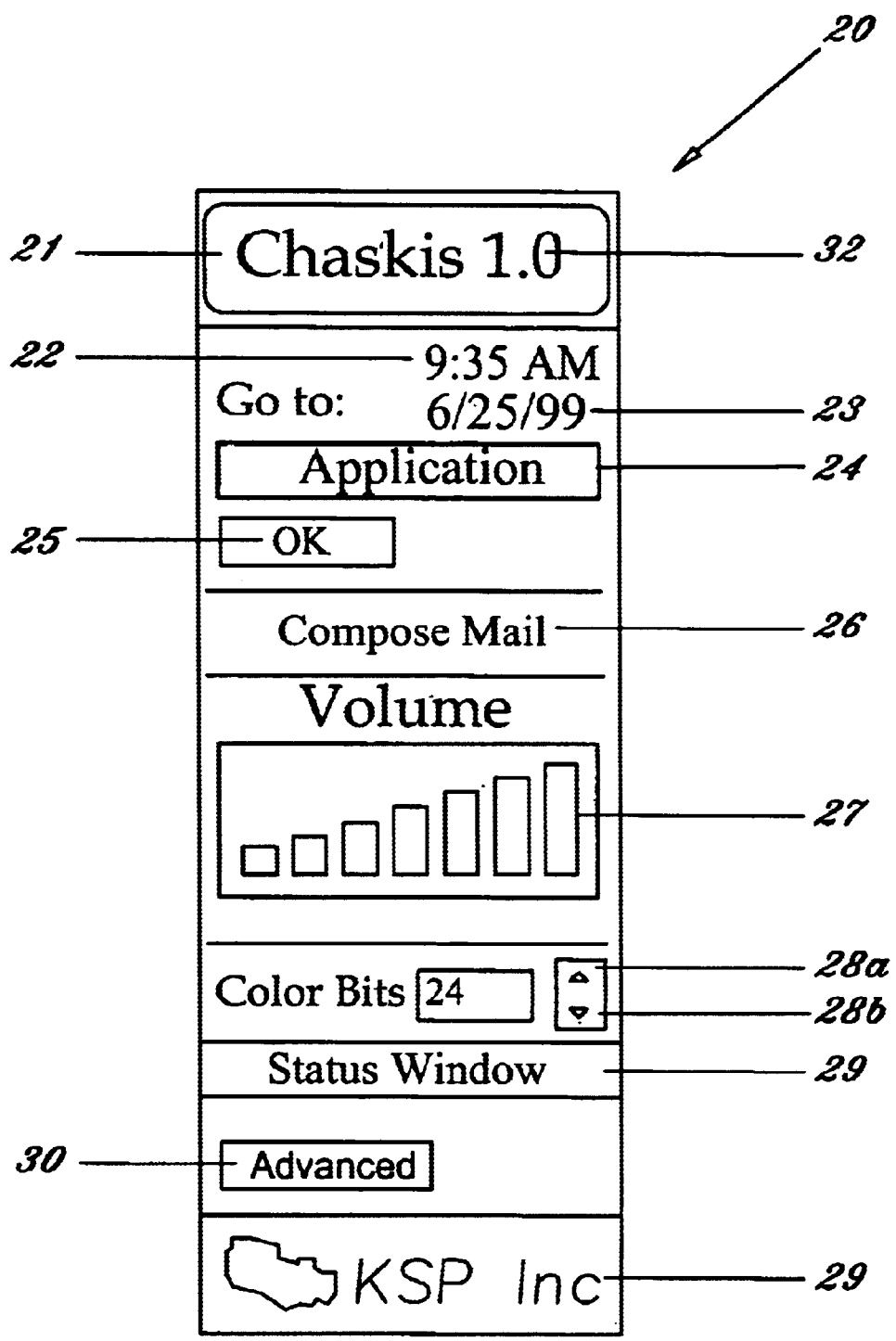
FIG. 2 is screen shot of the window produced by the application as it runs the methods described in FIG. 1.

FIG. 2 depicts window 20 that opens when a preferred form of the application is running. Window 20 contains identifier field 24. As stated, previously entered identifiers can be typed in identifier field 24. Then by clicking launch button 25, the application takes the identifier that was entered in identifier field 24 and launches the program that relates to the identifier.

Window 20 preferably includes buttons for commonly used applications. The inclusion of such buttons streamlines the launching of programs by even removing the requirement that the identifier be typed. Examples of these buttons include but are not limited to the following examples. Compose mail button 26 launches a blank email message within the default email browser when clicked. Volume control 27 changes the volume of the sound output when clicked. Resolution control 28 allows the resolution to be increased by pressing increase resolution button 28a and decreased by pressing decrease resolution button 28b. Advanced button 30 allows the application to be further customized. When advanced button 30 is pressed, an advanced window can open. The advanced window can contain controls such as initiating the previously described method for identifying computerized programs.

Window 20 can also be used to disseminate information. For example, window 20 can contain version panel 32 that displays what version of the software is being used. Window 20 can also include a logo that can deliver information about the programmer or advertisements.

The following subroutines can be included for the present invention.

To call an application from within the Text Field with the RETURN Key
    This calls for a keyboard key
    on keyDOWN
    This calls for the specific RETURN key
    if the key=RETURN then
    This calls for the application "notepad.exe"
    if the text of field "App"="notepad" then
    This opens the application "notepad.exe" if it exists on disk
    open "Applications\notepad.lnk"
      end if
      else
    This makes the RETURN key command be understood by the computer
    pass
      end if
    End of this Script
    end
    To call an application of the Text Field through the OK Button
    Calls for the Left-Click of the mouse
    on mouseup Reads the information on the "App" text field and calls for the application "Notepad.exe"

if the text of field "App"="notepad" then

Launches the Application "notepad.exe"

open "Applications\notepad.lnk"

end if

End of this Script end

The present invention preferably runs in all WINDOWS environments, though such is not limiting, and other environments are considered within the scope of the invention. The present invention can be written or created in several programming languages including, but not limited to, ones sold under the trademarks LINGO or MACROMEDIA.

The above specification and drawings show and describe the most practical and preferred embodiment as currently considered. However, departures that may be obvious to a person skilled in the art may be made from the preferred embodiments while remaining within the scope of the invention.

What is claimed is:

1. A method of launching a program within a graphical user interface independent of the need for a pull-down menu that also can reduce the time required to boot the graphical user interface, said method comprising the steps of:

(a) creating an identifier for said program in an application, (b) associating said identifier with said program in said application, (c) storing said identifier in said application, and (d) launching said program whenever said identifier is entered into said application, wherein said program is capable of being directly deleted from a start menu or from a desktop shortcut through said method, whereby said deletion of said program reduces the time required for subsequent booting of the graphical user interface.

2. A method as described in claim 1, wherein said program is an application.

3. A method as described in claim 1, wherein said program is a document.

4. A method as described in claim 1, wherein said program is a desktop shortcut.

5. A method as described in claim 1 further comprising the step of deleting any preexisting desktop shortcut.

6. A method as described in claim 1, wherein said program is a start-menu shortcut.

7. A method as described in claim 1, wherein said interface is one of the type capable of a multi-mode environment.

8. A method as described in claim 1, wherein said identifier is a combination of alphanumerical keystrokes.

9. A method as described in claim 1, wherein said application appears as a window within said interface.

10. A method as described in claim 1, wherein said application is able to associate a plurality of programs each to a separate unique identifier.

11. A computer application that executes a method of launching a computer program within a graphical user interface independent of the need for a pull-down menu that also can reduce the time require to boot the graphical user interface, said application comprising:

a window in said interface, an identifier field in said window where an identifier can be entered, and a launch button; wherein after said identifier has been entered said identifier field executes the method for launching when said button is clicked upon wherein said program is capable of being directly deleted from a start menu or from a desktop shortcut through said application, whereby said deletion of said program reduces the time required for subsequent booting of the graphical user interface.

12. A computer application as described in claim 11, wherein said computer program within said graphical user interface is chosen from the group consisting of a default e-mail application, a default web browser, a volume control, a new e-mail message, and a monitor resolution control.

13. A method as described in claim 11, wherein said application is able to associate a plurality of programs each to a separate unique identifier.

14. A method, of launching gram within an operating system capable of multi-mode environment independent of the need for a pull-down menu that also can reduce the time required to boot the graphical user interface that does not require a shortcut, said method comprising the steps of:

(a) creating an identifier for said program in an application, wherein said identifier is a combination of alphanumerical keystrokes, (b) associating said identifier with said program in said application, (c) storing said identifier in said application, (d) deleting said program when said program is a shortcut, and (e) launching said program whenever said identifier is entered into said application, wherein the step of deleting said program is performed on a program on a start menu or a desktop shortcut, thereby reducing the time required for subsequent booting of the graphical user interface.

\* \* \* \* \*